United States Patent [19]

Ryham

[11] Patent Number: 5,048,200
[45] Date of Patent: Sep. 17, 1991

[54] PROCESS AND APPARATUS FOR DEHUMIDIFYING WET AIR

[75] Inventor: Rolf Ryham, Princeton, N.J.

[73] Assignee: Ahsltromforetagen Svenska AB, Norrkoping, Sweden

[21] Appl. No.: 540,083

[22] Filed: Jun. 19, 1990

[51] Int. Cl.$^5$ .............................................. F26B 3/00
[52] U.S. Cl. ........................................ 34/32; 34/73; 34/155; 34/156; 34/114
[58] Field of Search .................. 62/94, 271, 93, 89; 34/23, 155, 156, 73, 74, 80, 32, 114

[56] References Cited

U.S. PATENT DOCUMENTS 4,803,846  2/1989  Assaf ........................... 62/94
4,841,740  6/1989  Assaf ........................... 62/271

Primary Examiner—Henry Bennett
Attorney, Agent, or Firm—Cohen, Pontani & Lieberman

[57] ABSTRACT

Wet air preferably from a liquid ring pump is dehumidified by the use of a desiccant liquid absorber. The heat released by condensation of water vapor in the absorption liquid will be taken up by the air. The air is further heated by water vapor produced by regenerating the absorption liquid. According to a preferred embodiment of the invention, the source of the wet air is a suction box in the forming section, couch roll or pick-up roll of a paper machine and the hot air is used as pocket ventilation air in the dryer section of the paper machine.

8 Claims, 1 Drawing Sheet

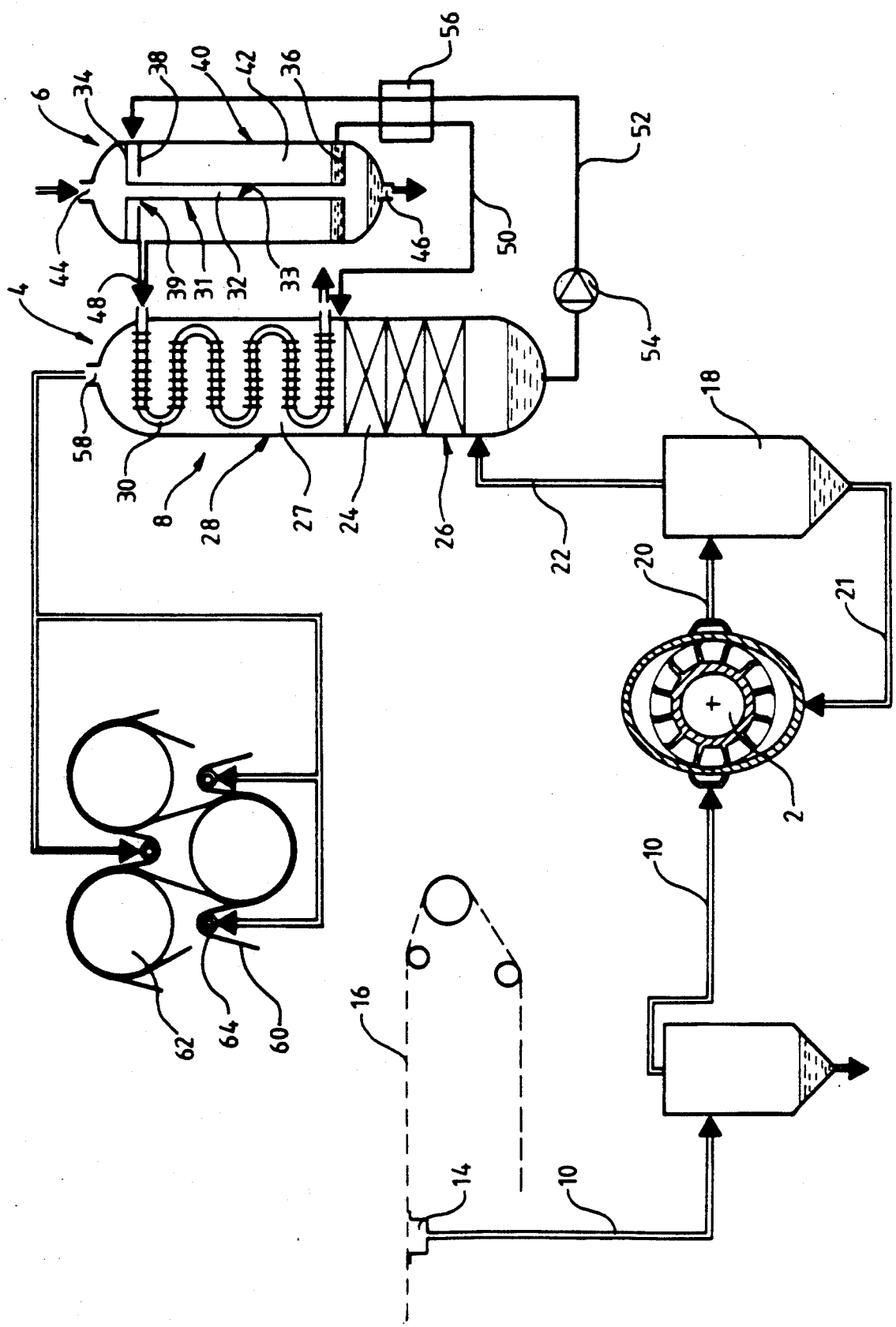

PROCESS AND APPARATUS FOR DEHUMIDIFYING WET AIR

FIELD OF THE INVENTION

The present invention relates to a process and apparatus for dehumidifying wet air preferably exhausted from a liquid ring pump, and especially a liquid ring vacuum pump connected to a suction box, couch roll or pick-up roll of a paper machine.

BACKGROUND OF THE INVENTION

The last dewatering device on a paper machine fourdrinier wire, just before the press section, is normally a series of suction boxes. Depending on the type of paper produced the number of the suction boxes and the pressure at which they are operated will vary. In addition the couch roll and press section pick-up roll also have a vacuum applied and are normally operated at a lower absolute pressure than the suction boxes. The vacuum in these suction boxes is maintained by the use of one or several liquid ring vacuum pumps.

The exhaust from such vacuum pumps is normally vented into the atmosphere and no heat is recovered due to the relatively low quality of heat (low temperature). The air which is being sucked through the wire and the fiber web, both, mechanically pull the water off the moving fibers as well as flash cool the water. This results in the air moving through the vacuum pump essentially being saturated with water vapor. During the compression cycle in the vacuum pump further water is evaporated from the seal water. The same is true for moist air coming from the couch roll and pick-up roll suction boxes.

Another known system utilizes a dry blower vacuum pump and thereby producing a relatively dry hot air. After further heating this air is said to be usable as pocket ventilation air for the paper machine ventilation system. The problem with this known system is the carry-over of fibers or fines from the suction boxes. This fiber will cause problems in the in-line steam heaters, which are normally of the fin type and sensitive to any material suspended in the air stream.

SUMMARY OF THE INVENTION

It is thus an object of the present invention to provide a method and apparatus for dehumidifying wet air and preferably wet air exhausted from a liquid ring pump.

Another object of the invention is to provide a method and apparatus for dehumidifying wet air withdrawn from a suction box or other dewatering device of a paper machine by a liquid ring vacuum pump and heating the air to a temperature suitable for pocket ventilation in the dryer section of the paper machine.

The liquid ring pump may generally be of the type described in the U.S. Pat. Nos. 2,195,174 and 2,195,375. The construction and operation of these pumps are known in the art and need thus not be described in more detail herein.

According to a preferred embodiment of the invention, a liquid ring vacuum pump is connected to a desiccant absorber to dehumidify the air by the use of an absorbent liquid and thereafter the water vapor is condensed and the exhaust air simultaneously heated. The hot air after the direct contact absorber is entirely free of fiber and can now be further heated by an in-line heater to a suitable temperature for use in pocket ventilation. A heating medium for the air can be used, for example, such as the condensing vapor from an absorbent regenerator (evaporator).

All heat losses resulting from cooling the stock on the wire and from the electric energy used for driving the vacuum pump, are thus recovered as hot air.

BRIEF DESCRIPTION OF THE DRAWING

The appended figure is a schematic illustration of a paper machine vacuum pump air recirculation system in accordance with the invention.

DETAILED DESCRIPTION OF THE PRESENTLY PREFERRED EMBODIMENT

As shown in the drawing, the air recirculation system comprises a liquid ring vacuum pump 2, an absorber 4, an evaporator 6 and a condenser 8. The vacuum pump is connected by a conduit 10 via a liquid separator 12 to a suction box 14 located on the underside of the web forming wire 16 of a paper machine. The vacuum pump is connected to a second liquid separator 18 through conduits 20 and 21. The lower end of the absorber 4 is connected to the upper end of the separator 18 through a conduit 22.

The absorber 4 is preferably a filled column type apparatus which includes layers of packing material 24 within absorber casing 26 and which provides intimate contact of an absorption liquid with the wet air flowing through it, preferably, in counter-flow.

The condenser 8 is disposed on top of the absorber and the casing 28 of the condenser forms with the casing 26 of the absorber a tower 27 through which the air flows. The condenser 8 is preferably of the single fin tube type in which a condenser tube 30 is disposed within the casing in serpentine manner.

The evaporator 6 may be either of tube or plate type. The evaporator shown in the drawing comprises a plurality of vertical tubes 32 (only one is shown). The ends of the tubes are attached to an upper tube plate 34 and a lower tube plate 36. A plate 38 disposed below the upper tube plate forms annular gaps 39 around the tubes. The tubes and the tube plates are enclosed in a casing 40. The upper and lower tube plate form, together with the wall of the casing, an enclosed space 42. The casing has an inlet 44 for a heating medium, such as low pressure steam, in its upper end and an outlet 46 for the heating medium in its lower end. A conduit 48 connects the upper portion of the enclosed space 42 to the upper end of the condenser tube 30. A conduit 50 connects the lower portion of the enclosed space 42 to the absorber at a level above the packing material 24. A conduit 52 connects the bottom of the absorber casing 26 to the space between the upper tube plate 34 and the plate 38 in the evaporator.

A pump 54 is disposed in the conduit 52. The flows through conduits 50 and 52 are passed through a heat exchanger 56, in which heat is transferred from one liquid on one surface of a heat exchange element to the other liquid on the other surface of the heat exchange element. An outlet 58 for air is provided in the casing of the condenser.

Air is drawn through the wet fiber web on the wire of the paper machine by the vacuum generated in the suction box 14. The wet air flows to the vacuum pump 2 at a pressure of approx. 10–20 inch Hg. The vacuum pump functions as a seal against the atmospheric pressure and the sealing medium is, in this case, water which will partially evaporate during the compression cycle of the pump. The air is discharged from the vacuum pump and transferred to the liquid separator 18 through conduit 20. The wet air and excess seal water is are separated in the separator 18 and the seal water returned to the vacuum pump through conduit 21.

The wet air is then passed through conduit 22 to the absorber 4 and caused to flow through the absorber-condenser tower 27. In the absorber, the wet air comes into contact with an aqueous hygroscopic absorption liquid which is supplied through conduit 50 to the upper end of the packing material 24 and is flowing down in counter-current to the air. Suitable absorption liquids are known and include an aqueous solution of potassium acetate, sodium acetate, potassium carbonate, calcium chloride, lithium chloride, lithium bromide, sodium hydroxide and/or mixtures thereof. Water vapor is condensed into the hygroscopic liquid due to the low water vapor pressure of the liquid. During the absorption of water vapor from the wet air the concentrated absorption liquid supplied to the absorber will be diluted and the diluted absorption liquid is thereafter collected at the bottom of the absorber casing to be removed by the pump 54 and passed to the evaporator through conduit 52. The air is thus adiabatically dried in that the heat released by condensation of the water vapor will be taken up by the air as sensible heat. Hence, the temperature of the air will consequently increase.

The water vapor condensed into the absorption liquid is evaporated in the evaporator 6 using low pressure steam supplied to inlet 44 as the heating medium. The diluted absorption liquid is introduced into the space between the upper tube plate 34 and the plate 38 and flows through the gaps 39 so that a thin liquid film of absorption liquid is formed on the outer surface 31 of the tubes 32. The steam supplied to the evaporator through inlet 44 is caused to flow through the tubes 32, whereby the absorption liquid flowing down on the outer surface of the tubes will be heated by indirect heat exchange with the steam on the inner surface 33 of the tubes.

The water vapor generated by evaporation of the absorption liquid is withdrawn from the enclosed space 42 of the evaporator and passed to the condenser 8 through conduit 48 to be condensed and to serve as a heating medium for the air which has passed through the absorption zone and packing material 24. The water vapor is introduced into the condenser tube 30 and heat is transferred by indirect heat exchange from the condensing vapor on the inside surface of the tube to the air on the outside surface of the tube. The heated air is withdrawn from the absorber/condenser 4,8 through outlet 58 and passed to a dryer section of the paper machine to be used as pocket ventilation air as shown in the drawing in which a felt 60 running along a portion of the periphery of the drying cylinders 62 is dried by hot air blown through the felt by means of perforated rolls 64.

The following examples further illustrate the present invention. Wet air may flow from a suction box mounted underneath the forming wire of a paper machine to a vacuum pump, such as, for example, a liquid ring pump at an actual flow speed of 8000 ACFM. The air has a relative humidity of 100% and a temperature of 110° F. In this case, the liquid ring pump operates at 400 HP pulling a vacuum of 10 inch HgV. Air having a temperature of approximately 130° F. leaves the separator 18 and is introduced into absorber 4 and heated therein to about 180° F. The air is further heated in accordance with the process of the present invention and leaves condenser 30 at a temperature of 240° F.

Wet air at a flow rate of 21,000 ACFM and having a relative humidity of 100% flows from a couch roll towards the vacuum pump (20 inch HgV at 1000 HP) and from there to the absorber/condenser, as described above. Initially, the air has a temperature of 110° F. Air leaving the separator 18 at a temperature of 130° F. and is introduced in the absorber/condenser of the present invention. In the absorber the air is heated to 180° F. and in the condenser to 240° F. for use as pocket ventilation air as described above.

Wet air coming from the suction device of a pick-up roll connected to a 250 HP liquid ring vacuum pump at a vacuum of 20 inch HgV, has an actual flow speed of 6000 ACFM, a temperature of 100° F. and a relative humidity of 100%. The air withdrawn from the separator 18 has a temperature of 120° F. and is introduced into the absorber/condenser of the present invention. The air is heated in the absorber to 180° F. and in the condenser to 240° F. and withdrawn therefrom for use as pocket ventilation air, as described.

It should be understood that the preferred embodiment and examples described above are for illustrative purposes only and is not to be construed as limiting the scope of this invention which is properly delineated only in the appended claims. While the invention has been herein shown and described as what is presently conceived to be the most practical and preferred embodiment thereof, it will be apparent to those having ordinary skill in the art, that many modifications may be made thereof within the scope of the invention.

What is claimed is:

1. A process for dehumidifying wet air generated in a paper making machine comprising the steps of:
    a) removing said wet air from said paper making machine by suction;
    b) contacting said wet air in an absorber with circulating absorption liquid comprising an aqueous hygroscopic salt solution to form diluted absorption liquid;
    c) heating at least a portion of said absorption liquid to its boiling point by indirect heat exchange with a heating fluid in an evaporator to form concentrated absorption liquid and water vapor;
    d) condensing said water vapor produced by heating said absorption liquid by indirect heat exchange with a cooling fluid in a condenser;
    e) passing said air through said absorber and utilizing said air as said cooling fluid in said condenser thereby heating and further drying said air;
    f) recirculating said concentrated absorption liquid to said absorber; and
    g) further utilizing said dried heated air as drying air in a drying section of said paper machine.

2. The process of claim 1, wherein said wet air having a first temperature is contacted with said absorption liquid under adiabatic conditions to form said diluted absorption liquid and air having a second temperature which is higher than said first temperature.

3. The process in accordance with claim 1, further comprising: cooling at least a portion of said diluted absorption liquid by bringing it into indirect heat exchanging contact with at least a portion of said concentrated absorption liquid.

4. The process in accordance with claim 1, wherein said absorption liquid is an aqueous solution comprising one of potassium acetate, sodium acetate, potassium carbonate, calcium chloride, lithium chloride, lithium bromide, sodium hydroxide and mixtures thereof.

5. An apparatus for dehumidifying a stream of wet air generated in a paper making machine, comprising:
   a) means for removing said wet air from said paper making machine;
   b) means connected to said air removing means for absorbing water from said stream of wet air by contact with a circulating absorption liquid;
   c) means for generating water vapor by evaporization of said diluted absorption liquid comprising a first heat exchange element having a first and a second heat exchange surface, said vaporization taking place on said first surface of said heat exchange element by addition of heat to said second surface of said first heat exchange element;
   d) means for condensing said water vapor comprising a second heat exchange element having a first and a second heat exchange surface, said condensation taking place on said first surface of said second heat exchange element with transfer of heat to said stream of air on said second surface of said second heat exchange element;
   e) means connecting said absorption means and said evaporation means for circulating said absorption liquid from said absorption means to said evaporation means and back to said absorption means;
   f) means connecting said evaporation means and said condensing means for transferring said water vapor from said evaporator to said condensing means; and
   g) means connected to said condensing means for directing said heated air to a drying section of said paper machine.

6. The apparatus in accordance with claim 5, further comprising means contacting said absorption liquid circulating means for cooling diluted absorption liquid comprising a third heat exchange element having a first and a second heat exchange surface for cooling said diluted absorption liquid on said first surface of said third heat exchange element with transfer of heat to concentrated absorption liquid on said second surface of said third heat exchange element.

7. The apparatus in accordance with claim 5, wherein said condensing means and said absorption means are disposed in the same housing and said condensing means is disposed above said absorption means.

8. The apparatus in accordance with claim 5, wherein said absorption liquid is an aqueous solution comprising one of potassium acetate, sodium acetate, potassium carbonate, calcium chloride, lithium chloride, lithium bromide, sodium hydroxide and mixtures thereof.

* * * * *